United States Patent Office 3,531,382
Patented Sept. 29, 1970

3,531,382
DRY OXIDE CAPACITORS AND METALLIZING PROCESS FOR MAKING THE CAPACITORS
Robert A. West, Hudson Falls, N.Y., assignor to General Electric Company, a corporation of New York
No Drawing. Filed Sept. 24, 1965, Ser. No. 490,103
Int. Cl. C23f 17/00; H01g 9/00, 13/00
U.S. Cl. 204—38                     8 Claims

ABSTRACT OF THE DISCLOSURE

An anodic oxide coated capacitor electrode is provided with a counter-electrode by etching the base electrode and forming an oxide coating thereon to follow the etched contours so as to be a rough or irregular surface. The oxide coating is contacted with a heat decomposable metal carbonyl compound in the gaseous state and then temperature of the metal compound is increased to above its decomposition temperature to decompose the compound and deposit the metal counter-electrode on the exposed surface of the anodic oxide layer as well as on those surfaces forming the pores and interstices thereof defined by the etching process.

---

The present invention relates to dry anodic oxide capacitors and more particularly to an improved method of forming dry anodic oxide capacitors of increased volumetric efficiency.

The dry anodic oxide type capacitor comprises a base metal, a dielectric layer thereon of an anodically formed metal oxide, and a metal counter-electrode. In the past, the counter-electrode has been deposited on the anodic oxide dielectric layer by vacuum evaporation of metal. In the conventional vacuum evaporation deposition process, the metal to be deposited moves from the source to the substrate to be coated in a line of sight path. This fact prevents the deposition of a counter-electrode on other than flat surfaces such as wire or coiled wire. Also, it prevents the deposition of a counter-electrode on the sidewalls of the pores of a porous layer such as the anodic oxide layer, the metal usually completely filling the pores. Since the capacity of a condenser or capacitor is proportional to the area of the counter-electrode, the full volumetric efficiency of the dry anodic oxide type capacitor has not been realized.

In accordance with the present invention, an improved dry anodic capacitor of increased volumetric efficiency is formed by etching the metal base of the capacitor, to produce an irregular surface thereon, depositing an oxide layer on the etched base and contacting the oxide layer with a heat decomposable metal carbonyl to form the counter-electrode thereon. By etching the base electrode, numerous surface indentations are formed providing a base with a large surface area without increasing the overall size of the base. The anodic oxide layer deposited on the base will also have a larger surface area. The use of the heat decomposable metal carbonyl compound for depositing the counter-electrode allows for the complete use of this large area since the compound can flow into porous areas and coat the walls thereof without filling the pores with the counter-electrode metal. Since the capacity of the capacitor is proportional to the area of the counter-electrode, a capacitor of increased volumetric efficiency may be produced.

More particularly, an aluminum oxide capacitor is formed by etching an aluminum metal base, anodically depositing aluminum oxide thereon and contacting the base with nickel carbonyl, either as a liquid or in the form of a gas, and decomposing the carbonyl to deposit a nickel counter-electrode within the pores of the aluminum oxide.

Preferably, the aluminum base is in the form of a coil of wire.

The metal base which is the first electrode of the capacitor and upon which the anodic oxide dielectric layer is ot be deposited may be in the form of a flat plate such as metal foil but it is preferably in the form of a coil of wire since the coil presents more metal surface per unit volume and facilitates capacitor manufacture. The metal can be aluminum, tantalum, columbium and metal alloys such as titanium-zirconium and titanium-molybdenum, aluminum being preferred.

The metal base is preferably etched to produce numerous pores or pits within the surface of the base and thereby increase the surface area of the base. The base may be chemically etched by dipping the metal in an acid bath such as hydrochloric acid or a dichromate bath. The base may also be mechanically etched by such means as sand blasting. Any known means for etching a metal surface is contemplated as having utility in the present invention.

Following the etching of the metal base, an anodic oxide dielectric layer is deposited on the base. The anodic oxide is formed by anodizing a metal such as aluminum, tantalum, columbium and metal alloys such as titanium-zirconium and titanium-molybdenum, aluminum being preferred. The anodizing is accomplished by dipping the metal in a film forming electrolyte such as boric acid, tartaric acid, phosphoric acid and salts thereof, glyco-borates, citric acid or other such known electrolytes which are useful for this purpose. The method of anodic oxide formation and appropriate voltages which are used are well known and do not need further illustration.

The organo-metallic compound which is used in the present invention is a vaporizable, decomposable compound which yields free electrically conductive metal upon decomposition. Of the various organo-metallic compounds which can be vaporized and which will decompose at elevated temperature to deposit an electrically conductive metal film, metal carbonyl compounds are preferred and these are illustrated by the following: nickel carbonyl, iron carbonyl, copper carbonyl, cobalt carbonyl, etc. Nickel carbonyl is especially preferred as it may be easily vaporized at a temperature of approximately 40° C. and decomposed at a temperature of less than 100° C.

The metal base with the anodic oxide dielectric layer thereon is preferably placed in a closed chamber for deposition of the counter-electrode. The closed chamber is provided with heating means so that the organo-metallic compound may be vaporized within the confines of the chamber. The heating means may be integral with the chamber such as electrical inductance heating wires or external thereto such as an oven or steam pipes surrounding the chamber as desired. While it is preferred to vaporize the organo-metallic compound within the chamber, it may also be vaporized in a separate vessel and supplied to the chamber in the vapor form by any appropriate means. Also, a heated inert gas such as nitrogen may also be used to cause the vaporization of the organo-metallic compound.

The organo-metallic compound is introduced into the chamber in any convenient manner such as a solvent solution or a liquid depending on the physical nature of the compound at room temperature.

When a liquid organo-metallic compound such as nickel carbonyl is used, it is preferred to bubble an inert carrier gas through the liquid and then introduce the carrier gas with the carried carbonyl compound into the closed chamber. Any inert gases may be useful for this purpose and preferred gases are illustrated by nitrogen, argon, and helium. Upon introduction to the chamber, heat is applied to cause the carbonyl compound to vaporize and surround the object to be coated.

The decomposition of the organo-metallic compound may be accomplished by any appropriate means. Thus the compound may be decomposed by elevating the temperature within the coating chamber by use of a heated gas such as steam or the coated object may be heated in an oven as desired. Alternatively, if desired, an electric current may be passed through the object being coated to cause the temperature of the object to be raised above the decomposition temperature of the organo-metallic compound.

Following the decomposition of the metal counter-electrode the capacitor may be encapsulated with non-conductive materials as is well known, for example with an epoxy or silicone resin.

The invention is illustrated in the example which follows which is intended as in no way limiting the invention.

A piece of aluminum wire (99.97% pure aluminum) having a diameter of 0.016 inch and a length of 5 inches is wound into a coil on a piece of plastic tubing having a diameter of 0.068 inch. The coil of wire may be etched chemically or electrolytically by well known methods. The coil is then dipped in an electrolytic bath containing boric acid and anodized until a voltage reading of 125 volts is reached. The anodized coil is dried and placed in a closed chamber and nickel carbonyl carried by nitrogen gas is introduced into the chamber. The chamber is heated to approximately 45° C. to vaporize the nickel carbonyl and the vapor is allowed to permeate the pores of the anodic oxide layer. The temperature is increased to 100° C. and the carbonyl compound decomposes depositing a counter-electrode of nickel on the anodic oxide layer. A control, made under the same conditions indicated above without the etching step produced a capacitor having a capacitance of 65,000 picofarads at 75 volts. The volume of the coil is 0.0018 cubic inch and the capacitance equals 37 microfarads per cubic inch. Following encapsulation, a capacitance of 25 microfarads per cubic inch is realized. The capacitor produced in accordance with the invention yielded a capacitance of 10–12 times that of the control, in the range of 370–444 microfarads.

While the invention has been described with particular reference to nickel carbonyl, it is to be understood that the other carbonyls herein described are equally suitable in the process of this invention.

The invention is defined in the claims which follow:

1. A method of forming a dry anodic oxide type capacitor of increased volumetric efficiency comprising
    (a) etching a base metal electrode to form an irregular surface thereon having pores at least some of which define inner port surfaces beyond line-of-sight paths through the pore openings,
    (b) forming a thin anodic oxide dielectric layer on said base metal electrode to follow the etched contours and provide a rough, irregular surface which includes said inner surfaces of said pores,
    (c) contacting said thin anodic oxide layer with a gas-borne heat-decomposable metal carbonyl compound which yields a free metal on decomposition, and selected from the group consisting of nickel carbonyl, iron carbonyl, copper carbonyl and cobalt carbonyl, and
    (d) heating said gas-borne metal carbonyl compound to above its decomposition temperature to decompose said compound and so as to deposit a metal counter-electrode on and against said anodic oxide layer including said oxide layer formed on the inner surfaces of said pores.

2. The method of claim 1 in which said base metal electrode is a coil of aluminum wire.

3. The method of claim 1 in which said metal carbonyl is nickel carbonyl.

4. The method of claim 1 in which said coil of metal is aluminum and said anodic oxide layer is aluminum oxide.

5. As an article of manufacture, an electrolytic capacitor made in accordance with the process of claim 1.

6. The method of forming a dry anodic oxide type capacitor of increased volumetric efficiency comprising
    (a) etching a coil of metal to form an irregular surface thereon having pores at least some of which define inner pore surfaces beyond line-of-sight paths through the pore openings,
    (b) forming an anodic oxide dielectric layer on said irregular surface including said inner pore surfaces,
    (c) mixing an inert carrier gas with a decomposable fluid metal carbonyl to form a gas-borne metal carbonyl capable of penetrating said pore openings,
    (d) contacting said anodic oxide layer with said gas-borne metal carbonyl while heating the carrier gas and metal carbonyl mixture to above the decomposition temperature of the metal carbonyl to thereby decompose said carbonyl and deposit metal counter-electrode on and against said anodic oxide layer including said oxide layer formed on said inner pore surfaces.

7. The method of claim 6 wherein the metal carbonyl is nickel carbonyl.

8. The method of claim 6 wherein said base metal substrate is aluminum and anodic oxide layer is aluminum oxide.

References Cited

UNITED STATES PATENTS

| | | | |
|---|---|---|---|
| 2,808,345 | 10/1957 | Traub | 117—107 |
| 2,930,951 | 3/1960 | Burger et al. | 204—42 |
| 2,995,471 | 8/1961 | Gurinsky | 117—106 |
| 2,995,473 | 8/1961 | Levi | 117—217 XR |
| 3,179,576 | 4/1965 | Huber et al. | 204—38.1 |
| 2,821,013 | 1/1958 | Schell | 117—107.2 XR |
| 3,023,491 | 3/1962 | Breining et al. | 117—107.2 XR |

OTHER REFERENCES

Condensed Chemical Dictionary, 6th edition, Rheinhold, p. 795.

ROBERT K. MIHALEK, Primary Examiner

W. B. VAN SISE, Assistant Examiner

U.S. Cl. X.R.

29—589; 117—200; 204—33; 317—230